United States Patent [19]

Storch

[11] Patent Number: 4,738,809

[45] Date of Patent: Apr. 19, 1988

[54] PROCESS AND APPARATUS FOR THE PRODUCTION OF A CUSHION ELEMENT

[75] Inventor: Helmut Storch, Amberg, Fed. Rep. of Germany

[73] Assignee: Grammer Sitzsysteme GmbH, Amberg, Fed. Rep. of Germany

[21] Appl. No.: 889,792

[22] Filed: Jul. 24, 1986

[30] Foreign Application Priority Data

Aug. 1, 1985 [DE] Fed. Rep. of Germany ....... 3527540

[51] Int. Cl.⁴ ............... B29C 67/22; B29C 39/10; A47C 7/18; A47C 7/36
[52] U.S. Cl. .................. 264/46.6; 249/91; 264/46.7; 264/46.8; 264/46.9; 264/161; 264/267; 297/410; 297/DIG. 1; 429/123; 429/127; 429/817 R
[58] Field of Search ............. 264/46.8, 46.6, 46.7, 264/46.9, 161, 267; 249/91; 425/123, 127, 817 R; 297/410, 2

[56] References Cited

U.S. PATENT DOCUMENTS

| | | | |
|---|---|---|---|
| 4,115,170 | 9/1978 | Sanson | 264/46.8 X |
| 4,116,736 | 9/1978 | Sanson et al. | 264/46.6 X |
| 4,268,557 | 5/1981 | Bracreco | 264/46.6 X |

FOREIGN PATENT DOCUMENTS 2927115 8/1981 Fed. Rep. of Germany .
2009022A 6/1979 United Kingdom .

Primary Examiner—Philip Anderson
Attorney, Agent, or Firm—Hoffmann & Baron

[57] ABSTRACT

In a process and apparatus for the production of a cushion element with a cover means enclosing same, at least one cover means is clamped with edge portions thereof between first and second clamping frames in such a way that the cover means defines a space therewithin. The clamping frames with the cover means clamped thereby are then held between first and second mold portions, with the cover means disposed in the mold cavity defined by the co-operation of the clamping frames and the mold portions. The cover means is drawn by suction against the mold cavity surface and a reaction mixture is then introduced into the space defined by the cover means within the mold cavity, through at least one feed opening. After reaction of the mixture the mold portions are separated and the cushion element with cover thereon from the mold. For the purposes of mechanically stiffening and reducing the weight of the cushion element, a member may be disposed within the cushion element, being positioned within the cover means in the mold cavity by means of a connecting member extending beyond the outside contour of the cushion element.

13 Claims, 4 Drawing Sheets

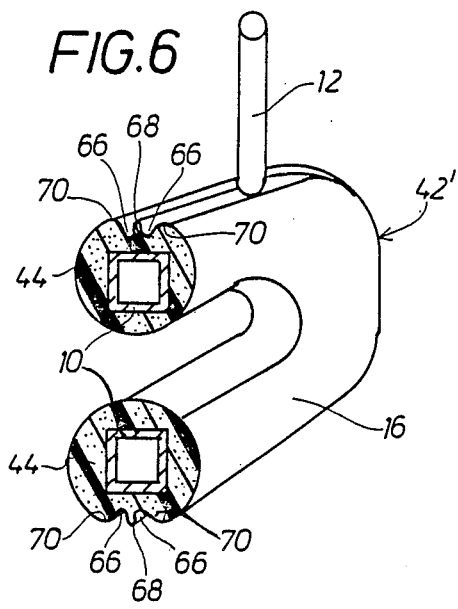
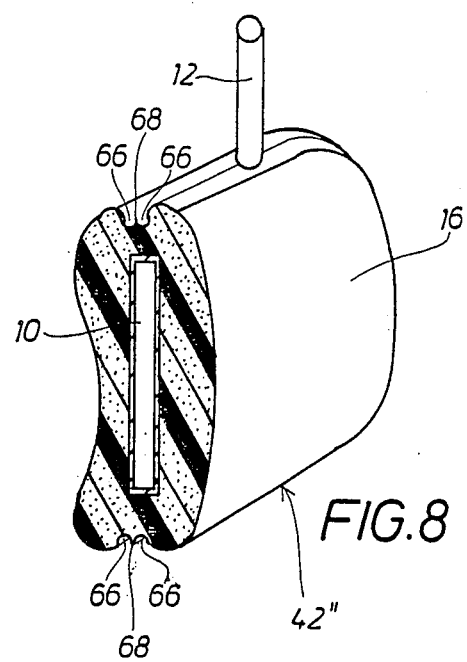
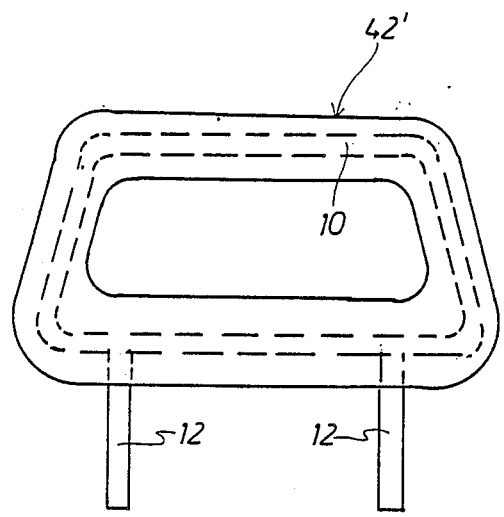
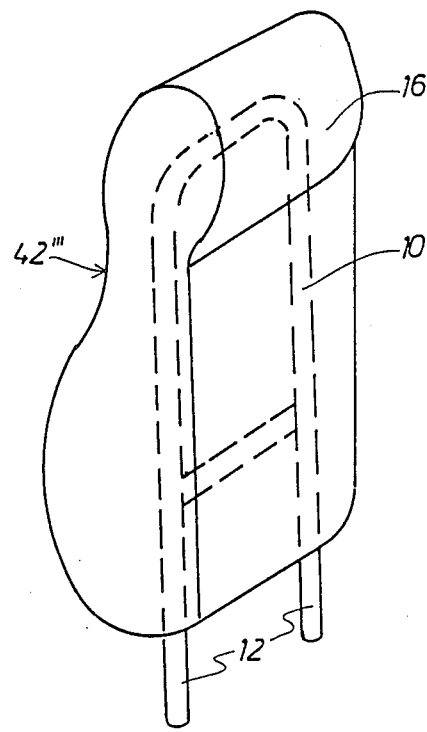

PROCESS AND APPARATUS FOR THE PRODUCTION OF A CUSHION ELEMENT

BACKGROUND OF THE INVENTION

The present invention relates generally to a process for the production of a cushion element, and apparatus for carrying out such a process.

In the context of this specification, such a cushion element may be for example but without limitation in respect thereof, in the form of the body portion of a head support or headrest for the back part of a seat, for example a motor vehicle seat, or the backrest portion or the squab or seat portion of such a seat.

In one form of a process for the production of a cushion element using a closable casting mold in which a plastic reaction mixture is caused to foam to produce the body portion of the cushion element, a piece of covering material which may be provided with a suitable lining is disposed on the mold and is drawn into contact with the internal surface defining the mold cavity by applying a vacuum thereto. The edge portions of the covering material project beyond the edge of the mold cavity. At the same time as the covering material is applied to the surface of the mold cavity, the mold is closed by means of a cover member and a reaction mixture is introduced into the closed mold. The reaction mixture may be for example a plastic material which, by the reaction of the mixture in the mold, foams up in the mold. The mixture, after conclusion of the reaction thereof in the mold, may produce a foam which is of a single defined level of hardness throughout, or a foam which comprises foams of different hardnesses in different regions thereof. After reaction of the mixture has occurred, the mold is opened, that is to say the cover member which closed the mold cavity is removed and the foamed cushion element which is provided with the covering material on the front side thereof is then removed from the mold. The projecting edge portions of the covering material are then trimmed off.

It will be noted that the rear side of the cushion element which is formed by the internal surface of the cover member closing the mold does not have any covering thereon. Therefore, after the edge portions of the covering material have been trimmed off, the cushion element needs to be subjected to a further processing operation to provide a cover on the rear side thereof. However, applying such a cover to the rear side of the cushion element, by virtue of involving an additional working operation, has an adverse effect on the cost of production of the cushion element.

SUMMARY OF THE INVENTION

An object of the present invention is to provide a process for the production of a cushion element having cover means on both sides thereof.

Another object of the present invention is to provide a process for the production of a cushion element by molding same with a cover completely enclosing the cushion element.

Still another object of the present invention is to provide a process for the production of a cushion element by molding within a cover means to provide a good fit for the cover means around the cushion element.

A further object of the invention is to provide an apparatus for the production of a cushion element incorporating a cover enclosing same.

Still a further object of the present invention is to provide an apparatus for the production of a molded cushion element incorporating a fully enclosing cover thereon, which is simple and reliable in operation.

In accordance with the present invention, in a first aspect thereof, these and other objects are achieved by a process for the production of a cushion element having a cover on same, by means of a molding operation in a casting mold. In that process, at least one cover means is clamped with the edge portions thereof between two clamping frames in such a way that the cover means encloses or defines a cavity therewithin. The two clamping frames are then clamped between two portions of the casting mold, with the mold portions co-operating with the clamping frames to define a closed mold cavity, with the cover means therewithin. A vacuum is then applied to the two mold portions within the mold cavity defined thereby, in order to draw the cover means therein into contact with the inside surfaces of the mold cavity. The cover means thus so-to-speak forms a lining on the inside surface of the mold cavity of the mold. A reaction mixture is then introduced into the mold through at least one feed opening, through at least one of said clamping frames, between two edge portions of the cover means, whereby the reaction mixture passes into the space within the cover means. After the reaction mixture has reacted within the cover means in the mold cavity, the mold cavity is opened by opening the two mold portions and the two clamping frames.

It will be seen therefore that, by virtue of the fact that the cover means is clamped with its two edge portions between first and second clamping frames which are fitted into the casting mold, it is possible for the cushion element to be molded with a cover on its rear side and a cover on its front side. The fact that at least one cover means is clamped between the first and second clamping frames in such a way as to define a hollow space within the mold cavity, for introduction of the reaction mixture thereinto, ensures that the part of the cover means which covers the front side of the cushion element is drawn by suction into contact with the mold half which corresponds to the front side of the cushion element, while similarly, the second part of the cover means which covers the rear side of the cushion element is drawn by suction into contact with the surface of the mold portion corresponding to the rear side of the cushion element, when the vacuum is applied to the mold portions as indicated above. The reaction mixture is introduced into the mold between the two edges of the at least one cover means disposed in the mold cavity, through at least one pouring opening which is provided between the two clamping frames. The edge regions of the cover means virtually close the pouring opening as long as no reaction mixture has been introduced into the mold through that opening. That ensures that the cavity of the casting mold is satisfactorily closed off so that the vacuum which is produced in the mold cavity for drawing the two parts of the cover means against the adjacent surfaces of the mold cavity in the mold can properly take effect in the mold cavity.

After reaction of the reaction mixture introduced into the mold has terminated, it is not just the two mold portions defining the mold cavity that are open, but therewith also the first and second clamping frames which held the cover means. The mold portions and the clamping frames may be opened at the same time as each other, or in succession. The process of the invention therefore makes it possible to provide a cushion element which is covered with a cover means not only on the front side thereof, but also on the rear side thereof, in a single working operation. Elimination of a subsequent separate operation for applying a further piece of cover material to the rear side of the cushion element thus contributes to reducing the costs of production of the cushion element as a whole.

In a preferred feature of the process of the invention, prior to the edge portions of the at least one cover means being clamped between the first and second casting frames, a body or member may be disposed in the space defined or enclosed by the cover means. When carrying out that form of the process of the invention, the body or member is preferably disposed in a first operation between the two parts of the at least one cover means, or between first and second cover portions forming said cover means, and the cover means is then clamped by means of the edge portions thereof between the first and second clamping frames. The body or member disposed within the cover means not only provides for an increase in the mechanical strength of the finished cushion element, by providing what is in effect internal reinforcement therein, but it also contributes to a saving in respect of the amount of reaction mixture used to produce the cushion element.

The body or member which is introduced into the interior of the cushion element prior to the molding operation may be provided with at least one connecting member which is clamped fast between the first and second clamping frames, with the edge portions of the cover means, and which projects out of the mold. The connecting member may be used subsequently for connecting the cushion element for example to another part of a vehicle seat, for example, when the cushion element is in the form of a head support, the connecting member may connect the cushion element is in the form of a backrest portion seat, or if the cushion element is in the form of a backrest portion itself, the connecting member may serve to connect it to a seat or squab portion, and so forth.

In accordance with another feature of the invention, the at least one connecting member as referred to above may be clamped fast between the clamping frames in such a way that the body or member in the interior of the mold is spaced at all sides thereof from the surfaces of the mold cavity or the cover means applied thereagainst. That means that the reinforcing member in the interior of the mold cavity is surrounded on all sides by the reaction mixture, which as stated occurs in the form of a plastic foam, so that the stiffening member, being disposed at least substantially centrally in the cushion element, does not have an adverse effect on the cushioning feel or action thereof. The at least one connecting member which is connected to the stiffening member may be mounted thereon rotatably in relation thereto so that the finished cushion element, in use thereof, may thus be pivoted about the connecting member where it projects out of the cushion element. That aspect may be of particular advantage in relation to cushion elements in the form of head supports.

In another preferred embodiment of the process of the invention, it has been found desirable for a hollow body to be disposed in the space enclosed by the cover means in the mold cavity. Besides the advantage of enhancing the mechanical strength of the cushion element and also providing a saving in respect of the amount of reaction mixture used to produce the cushion element, such a hollow body also gives the considerable advantage that the finished cushion element can then be of comparatively low weight.

It has further been found advantageous for a flexible feeder means or feedhead member to be arranged at the at least one pouring opening, between the edge portions of the cover means in the mold, with the reaction mixture being introduced into the mold through the flexible feeder means by means of a suitable mixing head. The mold is virtually closed off by such a flexible feeder means, by virtue of the feeder means closing the pouring opening with which it is in communication, until the reaction mixture is introduced into the mold by means of the mixing head. As soon as the reaction mixture is introduced into the mold by means of the mixing head, thus being introduced thereinto under a pressure, the flexible, closed feeder means opens up and expands so that the reaction mixture is not thereby prevented from passing into the mold and thus into the space defined by the cover means disposed against the internal surfaces of the mold cavity.

In another aspect of the present invention, the foregoing objects are achieved by an apparatus for producing a cushion element, comprising a closable casting mold having at least one pouring or feed opening for the introduction of a reaction mixture into the mold cavity. The mold comprises first and second mold portions which can be closed together along a peripheral contact region, which region is provided with mutually oppositely disposed and mutually co-operable recesses for accommodating first and second clamping frame means. The clamping frame means are provided with at least one pouring or feed opening at their mutually facing contact surfaces.

It will be seen that, by virtue of the fact that the mold does not comprise a mold portion which can be closed at the top thereof by a cover, as in the above-discussed prior-art process, but instead the mold is formed by first and second mold portions, one mold portion corresponding to the front side of the molded cushion element and the other mold portion corresponding to the rear side thereof, it is possible for the cushion element to be provided with a non-flat configuration not only on the front side thereof but also on the rear side thereof. That may be an important consideration in particular in relation to cushion elements in the form of backrest portions or in the form of head supports for motor vehicle seats because the rear side of such cushion elements is just as readily visible as the front side thereof.

Furthermore, by virtue of the apparatus according to the invention having the first and second clamping frames which are disposed between the two mold portions and which have at least one pouring or feed opening for feeding a reaction mixture into the mold, it is possible for a cover means to be clamped by means of its peripheral edge portion between the clamping frames in such a way that the two parts making up the cover means can be drawn by suction against the surfaces of the mold cavity defined by the first and second mold portions, subsantially without folds in the cover material, while the mold may be filled with a reaction mixture which is joined or bonded to the two parts of the cover means so that, after reaction of the reaction mixture has terminated, the cover on the cushion element is at least substantially fold-free and is thus of high-quality appearance.

In a preferred feature of the apparatus according to the teaching of this invention, it is desirable for the pouring opening to be of such a configuration as to enlarge towards the interior of the mold cavity through the contact surfaces of the first and second clamping frames and through the contact region between the first and second mold portions. The enlargement in the at least one pouring opening may be for example of a conical or tapering configuration. Enlarging the pouring opening in that way affords the advantage that the reaction mixture can be introduced into the mold without difficulties, so that it completely fills the interior of the mold.

In a preferred embodiment of the apparatus according to this invention, in order to produce a molded cushion element of a configuration which at the outside peripheral surface thereof provides at least first and second grooves or peripherally extending depressions and, between the grooves and depressions, a raised portion from which the edge regions of the at least one cover means project, the first and second clamping frames are provided in the vicinity of their above-mentioned contact surfaces with raised portions corresponding to the grooves or depressions to be provided in the peripheral surface of the cushion element, and a recess or depression corresponding to the raised portion on the peripheral surface of the cushion element. The peripherally extending recesses or grooves in the peripheral surface of the cushion element, with the raised portion disposed therebetween, form undercut configurations at the peripheral edge surface of the cushion element, while, where the cover means comprises two portions of cover material, those two portions meet along the peripherally extending raised portion on the peripheral edge surface of the cushion element. Because the edge portions of the two cover portions meet in that manner, they can be trimmed off in a simple fashion along the raised portion at the edge of the cushion element, after the latter has been removed from the casting mold.

In such a cushion element configuration, it has been found desirable for the peripherally extending raised portion to be below the highest adjoining regions forming the peripheral edge surface configuration of the cushion element. That configuration gives the advantage that the cut edges along which the edge portions of the two pieces of cover material which enclose the foam of the cushion element are cut off are not readily visible on the outside of the cushion element. That therefore provides a cushion element with a cover which closely covers the cushion element on all sides and in particular also along the line at which the portions of the cover meet, while the cut edges are further protected by the above-mentioned undercut configurations formed by the peripheral grooves and the raised portion therebetween.

In another preferred feature of the apparatus according to the invention, besides the two clamping frames having at least the one pouring opening at their mutually facing contact surfaces, they also have at least one opening for passing therethrough the above mentioned connecting member which thus projects from the casting mold. The number of openings for receiving connecting members projecting from the casting mold corresponds to the number of connecting members to be provided in projecting relationship from the cushion element. The or each such opening is of a cross-section which at least substantially corresponds to the cross-section of the connecting member. In that way, in the closed condition of the mold, the connecting member serves to complete the closure of the mold whereby the mold may then be completely filled with the reaction mixture.

Further objects, features and advantages of a process and apparatus in accordance with the principles of the present invention will become more clearly apparent from the following description of preferred embodiments thereof.

BRIEF DESCRIPTION OF THE DRAWINGS

FIG. 6 is a perspective view of one half of a frame-like head support with an undercut configuration extending around the outside peripheral edge thereof, FIG. 7 is a front view of a frame-like head support, FIG. 8 is a perspective view of one half of another embodiment of a head support with an undercut configuration extending around the peripheral edge thereof, and FIG. 9 is a perspective view of a cushion element in accordance with the invention in the form of the backrest portion of a motor vehicle seat.

DESCRIPTION OF PREFERRED EMBODIMENTS

Figure 1:
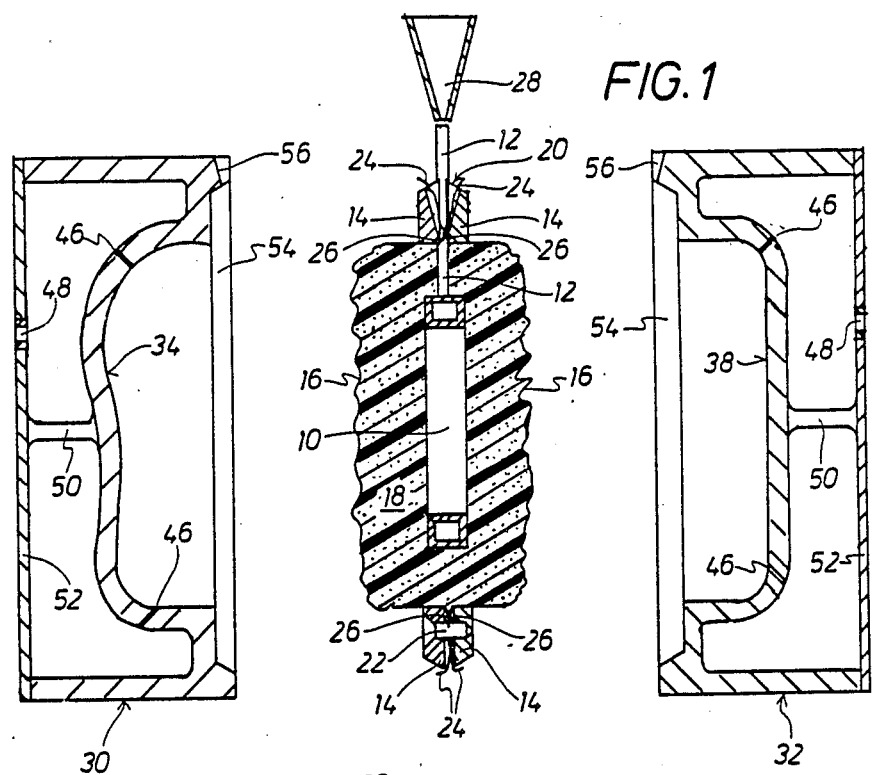
FIG. 1 is a diagrammatic view in cross-section of first and second mold halves in a spaced-apart position, and between same first and second clamping frames clamping first and second portions of cover material, with a hollow body disposed therebetween.

Referring firstly to FIG. 1, shown therein in cross-section is a hollow body or member 10 which is of a frame-like configuration and which carries at least one connecting member as indicated at 12, at one side thereof. The member 10 is intended to form a stiffening member within the interior of a foamed cushion element.

Figure 5:
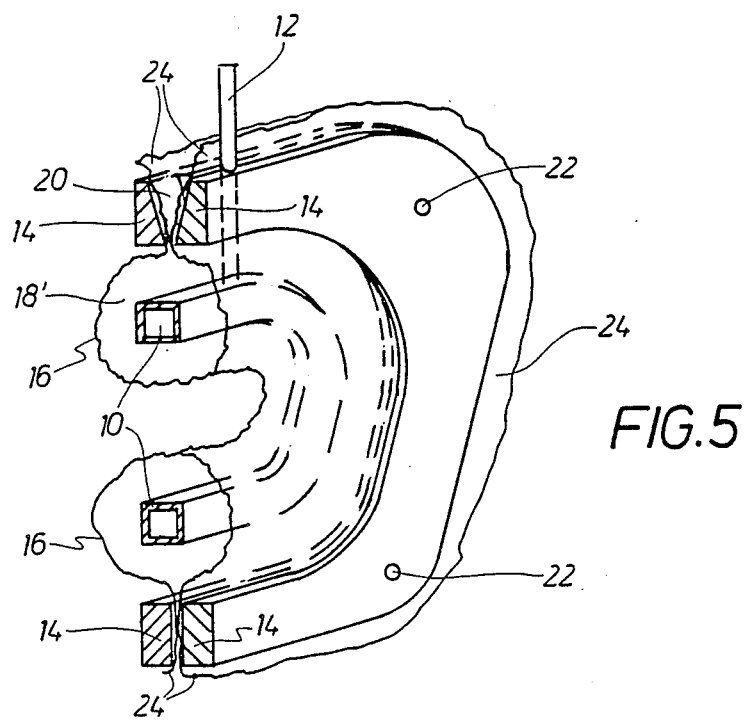
FIG. 5 is a perspective view of a portion of first and second clamping frames for clamping a cover means of a generally tubular configuration and for clamping a frame-like hollow body in the interior of the cover means, for the production of a head support of open frame-like configuration.

To produce the cushion element, the hollow member 10 is clamped by means of the connecting member 12 between first and second clamping frames 14 in such a way that the hollow member 10 is disposed substantially centrally between the clamping frames 14 and substantially centrally in the space defined thereby (a configuration of the clamping frames 14 can be clearly seen from FIG. 5, with the hollow member 10 disposed in the opening defined thereby). Reference numeral 16 in FIG. 1 denotes first and second portions of cover material, which are clamped by means of their edge portions between the clamping frames 14 in such a way that a space 18 is formed within the cover portions 16. Extending into the space 18 is a pouring opening 20 which is defined by the two clamping frames 14. The two clamping frames 14 may be connected together by suitable connecting elements as indicated at 20, which may be for example in the form of screws, in such a way that, as indicated above, the first and second cover portions 16 are fixedly clamped by means of their respective edge portions 24 between the contact surfaces 26 afforded by the first and second clamping frames 14, so that the cover portions 16 sealingly enclose the space 18.

Reference numeral 28 in FIG. 1 denotes a pliable or flexible feeder element or feedhead member whose external configuration matches the configuration of the opening 20 between the clamping frames 14, as can be clearly seen from FIG. 1.

FIG. 1 further shows first and second mold portions 30 and 32 in a spaced-apart position. It will be appreciated that at least one of the mold portions 30 and 32 is movable relative to the other mold portion, whereby the mold portions 30 and 32 can be brought together to define a mold cavity, by means of internal surfaces indicated at 34 and 38 on the mold portions 30 and 32 respectively. It will further be seen from FIG. 1 that the mold portions 30 and 32 are also spaced from the assembly consisting of the clamping frames 14 with cover portions 16 clamped thereby and hollow member 10 disposed in the interior thereof.

Figure 3:
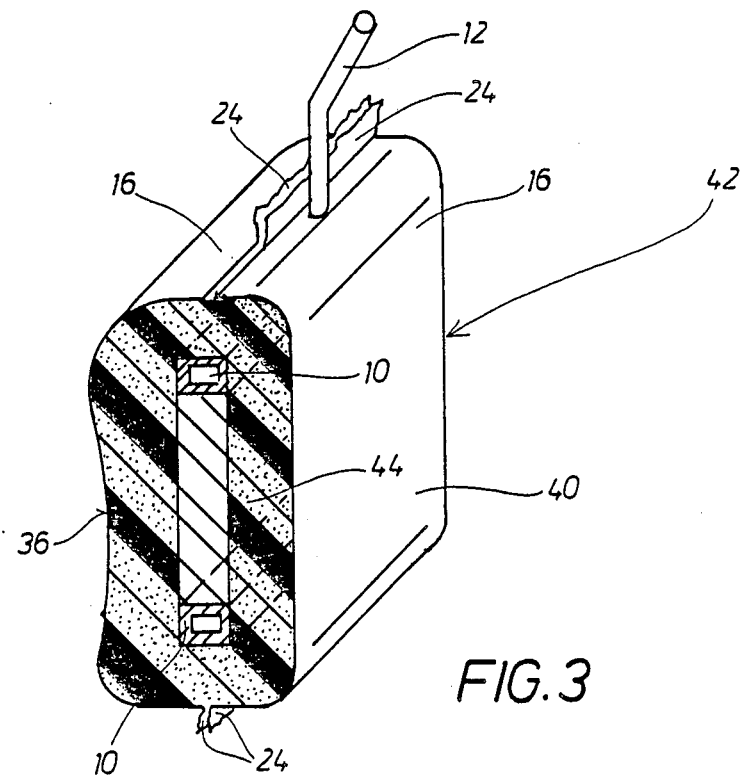
FIG. 3 is a sectional perspective view of a cushion element produced in a mold as shown in FIG. 2.

The internal surface 34 on the mold portion 30 corresponds to the contour of the front side 36 of the cushion element, as indicated in FIG. 3, while the internal surface 38 on the other mold portion 32 of the mold according to the invention corresponds to the contour 40 at the rear side of the cushion element, once again as shown in FIG. 3. Reference numeral 42 in FIG. 3 generally denotes the cushion element of which a part is shown in perspective in FIG. 3.

FIG. 3 also clearly shows the hollow support member 10 which is of an open frame-like configuration, being disposed in the centre of the cushion element 42 and being spaced at all sides from the inside surface of the cover 16. A reaction mixture has reacted to produce a foam around the support member 10 on all sides thereof, as indicated at 44. FIG. 3 further shows a connecting member 12 which projects from the cushion element 42 while also showing edge portions 24 of the first and second cover portions 16, which project beyond the edge of the cushion element 42.

It will be seen that FIG. 3 shows the connecting member 12 disposed laterally beside the two projecting edge portions 24, but it will be appreciated that, with the two clamping frames 14 being of a suitable configuration, it is also possible for the connecting member 12 to project from the cushion element 42 between the two edge portions 24 of the cover portions 16.

Referring once again to FIG. 1, the first and second mold portions 30 and 32 are provided with suction or vacuum openings 46, and connecting openings 48 for connection to a vacuum pump. Reference numeral 50 in FIG. 1 denotes ribs which are provided for mechanically stiffening the mold portions 30 and 32, relative to a housing 52 thereof. The mold portions 30 and 32 further have recesses 54 around the edge of the mold cavity defined by the surfaces 34 and 38, with the configurations of the recesses 54 matching the external configuration of the clamping frames 14. Reference numeral 56 in FIG. 1 denotes recesses in the mold portions 30 and 32, which form a extension for the pouring opening 20 in the clamping frames 14.

Figure 2:
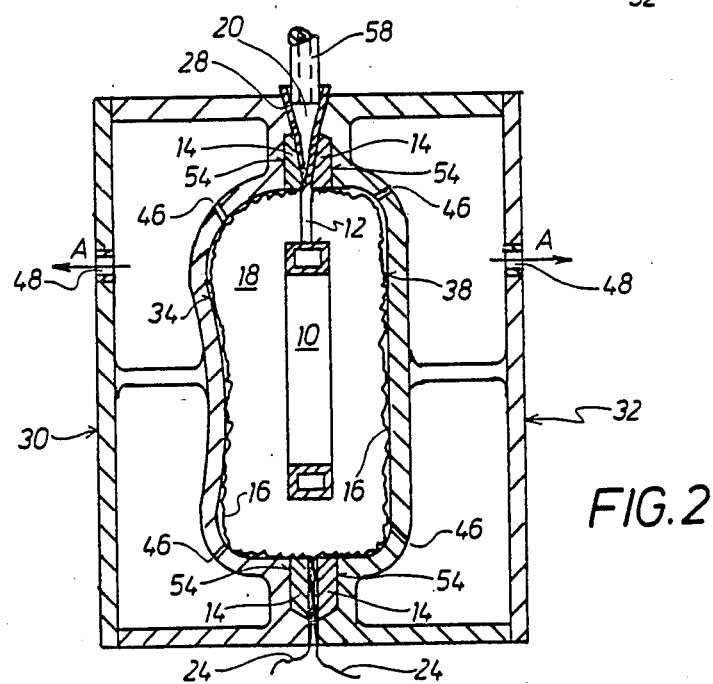
FIG. 2 is a view corresponding to that shown in FIG. 1 but in which the first and second mold portions are in the mold-closing position.

Reference will now be made to FIG. 2 showing the frame-like hollow member 10 clamped by means of its connecting member 12 between the two clamping frames 14, together with the two cover portions 16 which are thus also clamped between the two clamping frames 14 by means of their respective edge portions 24. As can be clearly seen from FIG. 2, the cover portions 16 are clamped by means of their edge portions 24 between the clamping frames 14 in such a way that they bear loosely against the internal surfaces 34 and 38 of the respective mold portions 30 and 32 in the closed condition of the mold as shown in FIG. 2. It will also be seen from FIG. 2 that, in the closed position, the mold portions 30 and 32 clamp the clamping frames 14 between them, with the clamping frames 14 being disposed in the respective recesses 54.

In the closed position of the mold portions 30 and 32, a vacuum is applied to the connection openings 48, as indicated by the arrows A in FIG. 2. That vacuum extends its effect from the openings 48 through the openings 46 into the mold cavity defined by the mold portions 30 and 32, whereby the first and second cover portions 16 are drawn by suction against the internal surfaces 34 and 38 of the mold portions 30 and 32, so as to lie substantially smoothly and in a wrinkle-free condition thereagainst. Immediately thereafter a mixing head 58 for injecting a reaction mixture into the mold cavity is inserted through the flexible member 28 disposed in the opening 20. A reaction mixture is introduced by means of the mixing head 58 through the opening 20 and into the space 18 defined by the two cover portions 16 which are in a condition of lying smoothly against the internal surfaces 34 and 38 of the mold portions. The reaction mixture completely fills the space 18 within the cover means. After reaction of the reaction mixture, during which the reaction mixture foams up, has terminated, the two mold portions 30 and 32 are moved apart again and then the first and second clamping frames 14 are separated from each other, thus resulting in a foamed and covered cushion element 42 of which a part is shown in a perspective view in FIG. 3. In a final working operation, the edge portions 24 of the two cover portions 16, which project beyond the external peripheral edge surface of the cushion element 42, are trimmed off.

Figure 4:
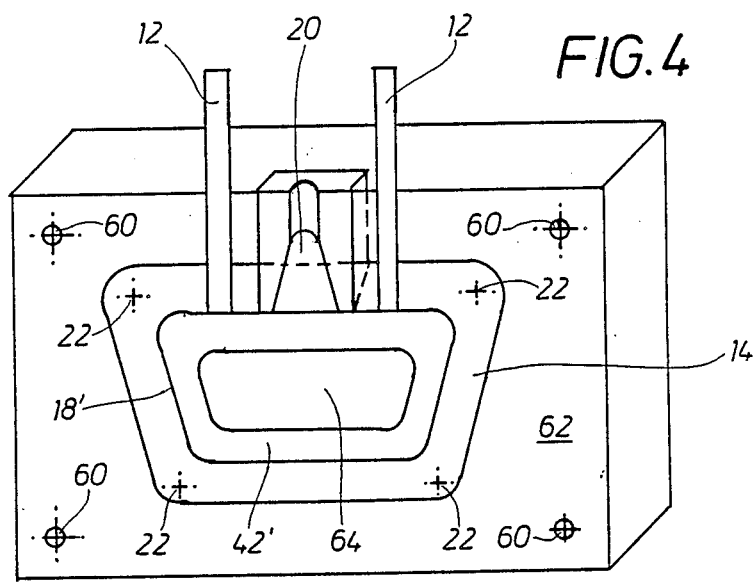
FIG. 4 is a perspective view of one portion of a mold according to the invention for the production of a head support or headrest of open frame-like configuration.

Reference will now be made to FIG. 4 showing a mold portion 32' which is suitable for the production of a cushion element 42' of an open frame-like configuration, as is required for example for the purposes of providing a head support. Reference numeral 14 in FIG. 4 once again shows a clamping frame, reference numeral 22 denotes fixing elements for clamping two such clamping frames 14 together while reference numeral 12 denotes first and second connecting members which project out of the mold portion 32'. Reference numeral 20 denotes the pouring opening through which a reaction mixture is introduced into the cavity defined by first and second mold portions. In the closed condition of the mold portions of which only the one mold portion 32' is shown in FIG. 4, the mold portions are connected together by connecting members (not shown) which extend through bores 60 which are in aligned relationship in the mold portions when the mold is closed. In FIG. 4, the space 18' in the mold, against which cover portions (not shown in FIG. 4) are drawn by suction, is delimited in the centre of the mold portion 32' by an insert portion 64 which terminates flush with the contact surface 62 of the mold portion 32'.

FIG. 5 shows a part of a hollow body 10 of an open frame-like configuration, which is clamped by means of connecting members, one of which is indicated at 12, between first and second clamping frames 14. A cover means 16 is likewise clamped by means of edge portions 24 thereof between the two clamping frames 14 in such a way that the cover means is disposed in a tubular configuration around the hollow member 10. A hollow space 18' is shown in FIG. 5, between the hollow member 10 and the cover means 16 extending in a tubular configuration therearound. FIG. 5 further shows a pouring opening 20 for introducing a reaction mixture into the space 18' within the cover means 16. It will be appreciated that the reaction mixture is only introduced into the space 18' after the cover means 16 has been drawn by suction into contact with the internal surface of a mold cavity defined by first and second mold portions, as for example the mold portion 32' shown in FIG. 4. Reference numeral 22 in FIG. 5 denotes connecting members which serve to connect the first and second clamping frames 14 together.

Reference is now made to FIG. 6 which shows a perspective view in section of one half of a cushion element 42' in the form of a head support of an open frame-like configuration, with connecting or mounting members 12 and a frame-like hollow body 10 which is enclosed on all sides by a reaction mixture 44. A cover 16 covers the cushion element 42' on all sides thereof.

In this embodiment, the cushion element 42' further comprises first and second depressions or grooves 66 which extend around the outside peripheral edge surface of the cushion element 42' and, between the grooves 66, a raised portion 68 which similarly extends around the peripheral edge surface of the cushion element. The grooves 66 together with the raised portion 68 therebetween together form undercut configurations. The raised portion 68 is preferably disposed at a lower level than the highest parts 70 of the peripheral edge surface of the cushion element 42' so that the edges of the cover 16, along which the edge portions thereof are trimmed off along the top of the raised portion 68, do not project beyond the peripheral contour of the cushion element 42'.

It will be appreciated that the clamping frames of the apparatus used for molding the cushion element 42' shown in FIG. 6 will be suitably provided with raised portions corresponding to the grooves 66 and a recess portion corresponding to the raised portion 68, to produce that peripheral edge configuration in the finished cushion element 42'.

FIG. 7 shows a front view of a cushion element 42' in the form of a head support of frame-like configuration, having two connecting or mounting members 12 with which the head support can be mounted to the backrest portion of a motor vehicle seat, in conventional manner. The connecting members 12 are connected to a frame-like member 10 which is shown in broken lines in FIG. 7, in the interior of the foam body portion of the cushion element 42'.

FIG. 8 shows another embodiment of a cushion element 42" in the form of a head support which has connecting or mounting members 12, only one thereof being shown in FIG. 8. Reference numeral 10 again denotes a hollow body which is disposed in the interior of the cushion element 42" and which is connected to the connecting members 12. The cushion element 42" has first and second recesses or grooves 66 extending around the peripheral edge surface of the cushion element, and a raised portion 68 which is disposed between the grooves 66 and which similarly extends around the peripheral edge surface of the cushion element. It will be clearly seen from FIG. 8 that the highest point of the raised portion 68 is below the level of the highest part of the peripheral edge surface of the cushion element.

In this embodiment of the cushion element 42' also, the recesses or grooves 66, with the raised portion 68, from undercut configurations, with the edge portions of the cover 16 preferably occurring on the raised portion 68, to facilitate trimming thereof.

FIG. 9 is a perspective view of a further embodiment of a cushion element 42''' in the form of the backrest portion for a motor vehicle seat. Two connecting or mounting members 12 project out of the underside of the cushion element 42", and can be fitted into suitable mountings or openings in a seat portion of a motor vehicle seat. Reference numeral 10 denotes a frame member which is disposed in the interior of the cushion element 42''' and which serves for mechanically strengthening and stiffening the backrest portion. In this embodiment of the cushion element also, the cover 16 covers both the front and the rear of the backrest portion.

It will be appreciated that the above-described constructions have been set forth solely by way of example of the present invention and that various modifications and alterations may be made therein without thereby departing from the spirit and scope of the invention.

What is claimed is:

1. A process for the production of a cushion element having a covering material enclosing same, by means of molding in a mold comprising first and second mold portions each having apertures for applying suction thereto, said mold having a mold-open position and a mold-closed position in which a mold cavity is provided to which suction can be applied through said apertures, said process comprising:
    (a) clamping said covering material with edge portions thereof between first and second clamping frames such that a space is defined within said covering material, with said edge portions thereof projecting beyond said mold cavity;
    (b) clamping said clamping frames between said mold portions, said mold portions cooperating with said clamping frames to define said closed mold cavity;
    (c) applying a reduced pressure to said mold portions to draw by suction said covering material into contact with the inside surfaces of said mold cavity;
    (d) introducing a foamable reaction mixture into said mold and into said space within said covering material through a feed opening which passes through at least one of said clamping frames, between said edge portions of said covering material; and
    (e) opening said mold portions and said clamping frames after reaction of said reaction mixture for release of said cushion element therefrom.

2. The process of claim 1 wherein said edge portions are trimmed after removal of said mold portions and said clamping frames.

3. The process of claim 1 wherein a member is disposed in said space within said covering material prior to said edge portions being clamped between said clamping frames.

4. The process of claim 3 wherein said member is provided with a connecting means which projects out of said mold and is clamped fast between said clamping frames in said mold-closed position.

5. The process of claim 4 wherein said member is spaced away from said covering material when said connecting means is clamped between said clamping frame.

6. The process of claim 3 wherein said member is hollow.

7. The process of claim 1 wherein said reaction mixture is introduced into said mold through a flexible feed head means disposed at said feed opening whereby said reaction mixture can be received from a mixing head.

8. Apparatus for producing a cushion element having covering material encasing same comprising:
   first and second clamping frames adapted to clamp therebetween edge portions of said covering material for encasing said cushion elements so that a space is provided within said clamped covering material to receive a reaction mixture therein;
   first and second mold portions adapted to provide a mold open position and a mold closed position, each said mold portion having a recess wherein said first and second clamping frames are disposed in mutually opposite cooperating relationship in said mold closed position; and
   a feed opening provided in at least one of said clamping frames in said mold closed position for introduction of said reaction mixture into said space within said covering material.

9. The apparatus as set forth in claim 8 wherein said feed opening has an enlarging configuration in a direction outwardly from said mold cavity which continues through the peripheral contact region at which said first and second mold portions come into mutual contact in said mold closed position.

10. The apparatus as set forth in claim 8 wherein said first and second clamping frames further comprise raised portions adjacent the contact surfaces thereof adapted to produce corresponding recesses extending around said cushion element along the peripheral edge surface thereof, and a recess between said raised portions adapted to produce a corresponding raised portion extending around the periphery of said cushion element between said raised portions on said cushion element.

11. The apparatus as set forth in claim 10 wherein said peripheral raised portion on said cushion element is lower than the highest portions of the outside peripheral edge contour of said cushion.

12. The apparatus as set forth in claim 8 wherein said clamping frames further include an opening for passing a connecting member therethrough which projects outwardly from said mold in said mold closed position and is connected to a member within said cushion element.

13. Apparatus for the production of an element comprising a body portion of plastic foam and a cover encasing said body portion in close contact with the surface thereof comprising:
   first and second clamping members adapted to co-operate with each other to hold therebetween the edge region of at least one portion of cover material so disposed in said clamping members as to provide an enclosed space within said at least one portion, said clamping members extending around said at least one portion,
   first and second mold portions each comprising means defining respective portions of a mold cavity therein, at least one of said mold portions being movable relative to the other between a first position in which said mold portions are spaced from each other and a second position in which said mold portions are in a mold-closing condition such that said respective portions of said mold cavity are in mutually co-operating relationship;
   means operable to move said mold portions between said first and second positions thereof,
   at least one of said mold portions including means around the respective said mold cavity portion adapted to receive a respective said clamping member whereby in said second position of said mold portions with said clamping members disposed between said mold portions said mold portions and said clamping members co-operate to define the closed mold cavity
   duct means in each said mold portion communicating with the respective said mold cavity portions and adapted to be connected to a suction source for drawing said cover material portion into contact with the inside surfaces of said mold cavity in the closed condition thereof;
   in at least one said clamping member a feed opening means for the introduction of plastic foam-forming material into said closed mold cavity; and
   means for introducing plastic foam-forming material through said opening means into said mold cavity.

* * * * *